United States Patent [19]

Horner

[11] 4,206,239

[45] Jun. 3, 1980

[54] PASTE PRODUCT AND PROCESS FOR ITS PREPARATION AND USE

[75] Inventor: Douglas H. Horner, Pierrefond, Canada

[73] Assignee: The House of Paris Pate Inc./La Maison Paris Pate, Inc., Montreal, Canada

[21] Appl. No.: 912,140

[22] Filed: Jun. 2, 1978

[30] Foreign Application Priority Data

Jan. 31, 1978 [CA] Canada .................. 295953

[51] Int. Cl.$^2$ .................................. A23L 1/34
[52] U.S. Cl. ........................ 426/92; 426/578; 426/582; 426/589; 426/653; 426/401; 426/574; 426/94
[58] Field of Search ............... 426/589, 129, 131, 578, 426/574, 641, 653, 661, 399, 401, 582, 92, 94

[56] References Cited

U.S. PATENT DOCUMENTS

| | | | |
|---|---|---|---|
| 1,850,037 | 3/1932 | Stickell et al. | 426/589 |
| 2,653,876 | 9/1953 | Hanson | 426/578 |
| 3,232,770 | 2/1966 | Schack et al. | 426/401 |
| 3,257,214 | 6/1966 | McDermott | 426/589 |
| 3,454,405 | 7/1969 | Beach | 426/602 |
| 3,480,450 | 11/1969 | Edlin et al. | 426/569 |
| 3,519,434 | 7/1970 | Schuppner | 426/574 |
| 3,769,042 | 10/1973 | Kaplow | 426/641 |
| 3,946,123 | 3/1976 | Hanna | 426/641 |
| 3,973,051 | 8/1976 | Buckley | 426/574 |

*Primary Examiner*—Jeanette M. Hunter
*Attorney, Agent, or Firm*—Millen & White

[57] ABSTRACT

A sterile canned food paste and process for preparing the same is provided herein. The food paste includes, in the same sterile can, a food paste composition having a homogenized mixture of about 30 to about 50% by weight of the final product of water, about 2 to about 5% by weight of the final product of gelatinized wheat flour, about 0.5 to about 2% by weight of the final product of tomato paste, about 2 to about 8% by weight of the final product of vegetable oil, about 10 to 35% by weight of the final product of cheese, (e.g. mozarella), and vinegar, and, dispersed therein, about 1 to about 35% by weight of the final product of sliced cured meat product in discrete sliced form (e.g. a sausage-like product such as pepperoni), as well as such other ingredients as about 0.5 to about 1.5% by weight of the final product of spices, about 0.3 to about 2% by weight of the final product of onion paste, about 0.5 to about 1.5% of the final product by weight of vinegar, about 1 to about 3% by weight of the final product of discrete pieces of green peppers, and about 0.3 to 2% by weight of the final product of discrete pieces of mushroom. This provides a food paste that may be applied to a baked product without the addition of further cheese from a separate package and heated to melt the cheese to provide a pizza-like product.

26 Claims, 1 Drawing Figure

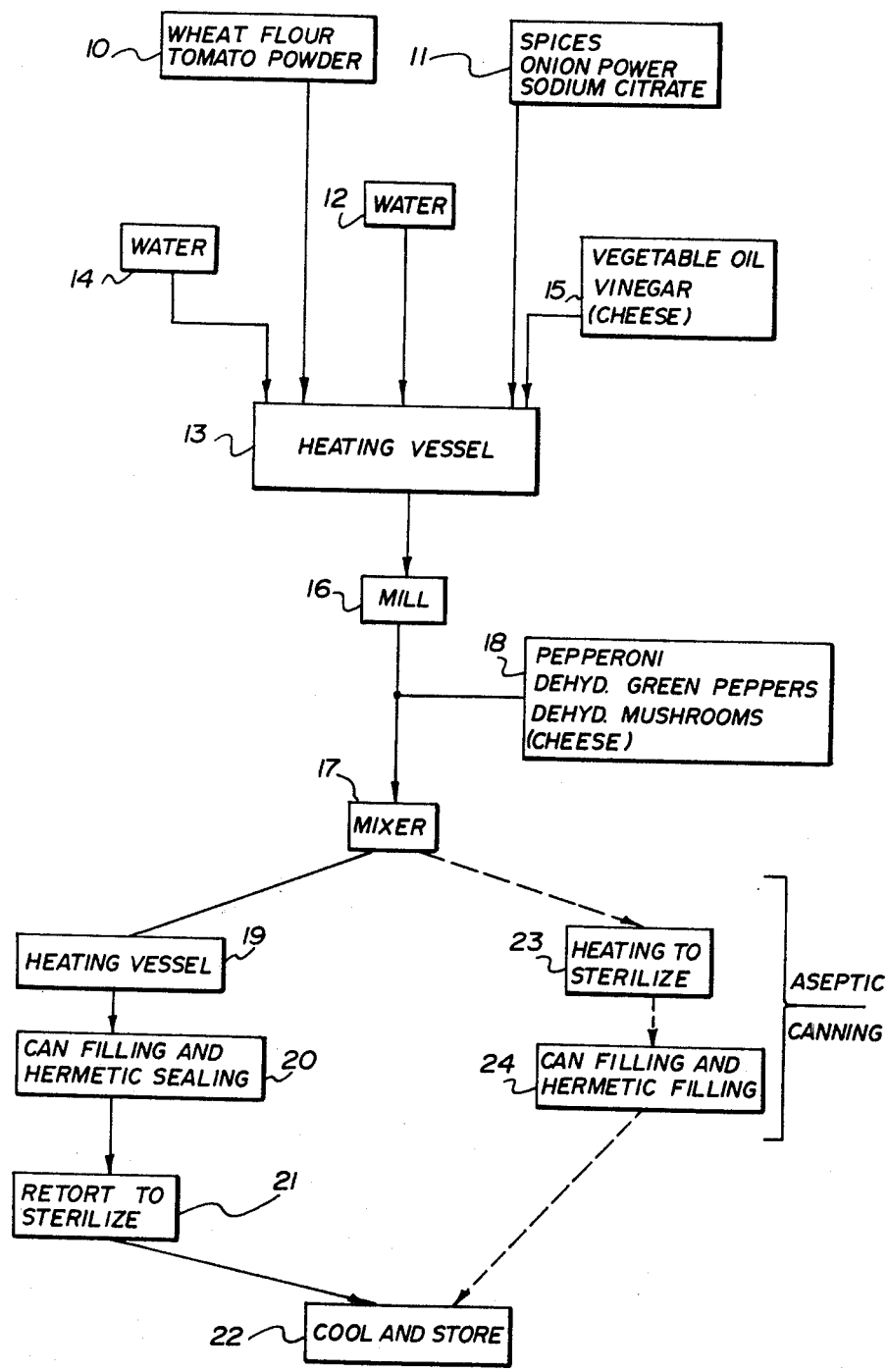

PASTE PRODUCT AND PROCESS FOR ITS PREPARATION AND USE

BACKGROUND OF THE INVENTION (i) Field of the Invention

This invention relates to a process of preparing a food product and to the food product so prepared. More particularly it is directed to the production of a cheese-containing, meat-containing, and tomato-containing paste, and to the food paste so prepared.

(ii) Description of the Prior Art

Food pastes having characteristic pizza-like qualities provided in the past have generally not contained both meat in fairly large discrete form and cheese in the same hermetically sealed aseptic or sterile package. Thus, in many instances, such pastes providing characteristic pizza-like qualities containing meat, tomato paste, etc., have been provided as a sauce in a hermetically sealed aseptic or sterile package, and the cheese has been provided in a separate package to be sprinkled on after the sauce like preparation paste has been applied to the bread, etc. Such two component package for providing the food paste and the eventual use of the product is considered to be undesirable.

SUMMARY OF THE INVENTION

Aims of the Invention

Accordingly, one object of this invention is the provision of a process for providing a cheese-containing, meat-containing, and tomato-containing paste having the characteristic pizza-like qualities in a unitary hermetically sealed aseptic or sterilized package or can.

Another object of this invention is to provide a novel hermetically sealed aseptic or sterilized package containing water, a discrete sliced meat-product, cheese, vegetable oil and tomato paste.

Statement of the Invention

By this invention a process is provided for preparing a hermetically sealed, commercially sterile food paste adapted to be spread on a baked product and then heated to provide a pizza-like product for human consumption comprising the steps of:

(1) mixing about 2 to about 5% by weight of the final product of wheat flour, about 0.5 to about 2% by weight of the final product of tomato powder, and flavoring ingredients, with a sufficient quantity of water and for a sufficient period of time at a sufficient temperature to gelatinize the wheat flour;

(2) adding further water along with about 2 to about 8% by weight of the final product of vegetable oil, vinegar and about 10 to about 35% by weight of the final product of cheese and heating the so-formed mixture to a temperature of about 140°–160° F. (about 60°–71° C.);

(3) homogenizing said mixture to a fine, oil-in-water emulsion at a temperature of about 140°–160° F. (about 60°–71° C.);

(4) adding about 1 to about 35% by weight of the final product of discrete sliced cured meat product having a thickness to provide sufficient pliability to withstand the rigours of pumping and filling; and (5) subjecting said food paste to heating, filling by pumping said homogenized mixture and said discrete sliced meat product, hermetic sealing, and sterilizing procedures, thereby to provide a commercially sterile food paste comprising a homogenized mixture of about 30 to 50% by weight of the final product of water, about 2 to about 5% by weight of the final product of gelatinized wheat flour, about 0.5 to about 2% by weight of the final product of tomato paste, about 2 to about 8% by weight of the final product of vegetable oil, about 10 to about 35% by weight of the final product of cheese, and vinegar, and, dispersed therein, about 1 to about 35% by weight of the final product of sliced cured meat product in discrete sliced form.

Also for preparing a hermetically sealed, commercially sterile, food paste adapted to be spread on a baked product and then heated to provide a pizza-like product for human consumption comprising the steps of:

(1) mixing about 2 to about 5% by weight of the final product of wheat flour, about 0.5 to about 2% by weight of the final product of tomato powder, and flavouring ingredients with a sufficient quantity of water and for a sufficient period of time at a sufficient temperature to gelatinize the wheat flour;

(2) adding further water along with about 2 to about 8% by weight of the final product of vegetable oil, and vinegar, and heating the so-formed mixture to a temperature of about 145°–165° F. (about 63°–74° C.).

(3) homogenizing said mixture to a fine oil-in-water emulsion at a temperature of about 145°–165° F. (about 63°–74° C.).

(4) adding about 10 to about 35% by weight of the final product of cheese and about 1 to about 35% by weight of the final product of discrete sliced cured meat product having a thickness to provide sufficient pliability to withstand the rigours of pumping and filling;

(5) subjecting said food paste to filling by pumping said homogenized mixture and said discrete sliced meat product, hermetic sealing, and sterilizing procedures, thereby to provide a commercially sterile food paste comprising a homogenized mixture of about 30 to about 50% by weight of the final product of water, about 2 to about 5% by weight of the final product of gelatinized wheat flour, about 0.5 to about 2% by weight of the final product of tomato paste, about 2 to about 8% by weight of the final product of vegetable oil, about 10 to about 35% by weight of the final product of cheese, and vinegar, and, dispersed therein, about 1 to about 35% by weight of the final product of sliced cured meat product in discrete sliced form.

By this invention, a commercially sterile canned food product is also provided comprising a homogenized mixture of about 30 to 50% by weight of the final product of water, about 2 to about 5% by weight of the final product of gelatinized wheat flour, about 2 to about 8% by weight of the final product of vegetable oil, about 0.5 to about 2% by weight of the final product of tomato paste, about 10 to about 35% by weight of the final product of cheese, and vinegar, and, dispersed therein about 1 to about 35% by weight of the final product of sliced cured meat product in discrete sliced form.

Other Features of the Invention

By one feature, of this process, step (1) is carried out in the presence of about 5–10% of the total weight of the final product, of water for a time of about 4–5 minutes at a temperature of about 180°–190° F. (about 82°–88° C.).

By another feature of this process, the sliced cured meat product is present in the form of slices about 2.5±0.5 mm in thickness.

By still another feature of this process, step (5) comprises the steps of (a) heating the food paste to a temperature of about 125°–135° F. (about 52°–57° C.); (b) filling containers with such heated food paste; (c) hermetically sealing such containers; and (d) retorting such hermetically sealed containers at a temperature of about 235°–245° F. (about 113°–118° C.) for about 60–90 minutes.

By yet another feature of this process, step (5) comprises the steps of (a) heating such food paste to sterilizing temperatures of about 180°–190° F. (about 82°–88° C.) for a time of about 10–15 minutes; (b) then without substantial cooling, filling sterile containers with such heated food product; and (c) hermetically sealing such containers.

By still another feature of this process, the process includes the final step of (6) cooling such cans and storing such cooled cans.

By one feature of this product, the food product also contains about 0.5 to about 1.5% by weight of the final product of spices, about 0.3 to about 2% by weight of the final product of onion paste, about 0.5 to about 1.5% by weight of the final product of vinegar, about 1 to about 3% by weight of the final product of discrete pieces of green peppers, and about 0.3 to 2% by weight of the final product of discrete pieces of mushrooms.

By yet another feature of this product, the sliced cured meat product is pepperoni (a sausage-like product) having a thickness of about 2.5±0.5 mm.

By yet another specific feature, the food product comprises the following:

| Ingredient | Proportion (% by weight) (of the final product) |
| --- | --- |
| Water | about 30–50 |
| Sliced cured or processed meat product | about 1–35 |
| Cheese | about 10–35 |
| Vegetable oil | about 2–8 |
| gelatinized Wheat flour | about 2–5 |
| Sodium Citrate | about 0.8–1.8 |
| discrete pieces of green peppers | about 1–3 |
| Spices | about 0.5–1.5 |
| Tomato paste | about 0.5–2 |
| Vinegar | about 0.5–1.5 |
| discrete pieces of mushrooms | about 0.3–2 |
| Onion paste | about 0.3–2 |

By a preferred feature, the food product comprises the following:

| Igredient | Proportion (% by weight) of the final product |
| --- | --- |
| Water | about 39.35 |
| Pepperoni (a sausage-like product) | about 26.00 |
| Mozarella cheese | about 20.00 |
| Vegetable oil | about 5.00 |
| gelatinized Wheat flour | about 4.00 |
| Sodium Citrate | about 1.5 |
| discrete pieces green peppers | about 1.2 |
| Spices | about 1.1 |
| Tomato paste | about 0.8 |
| Vinegar | about 0.4 |
| discrete pieces of mushrooms | about 0.35 |
| Onion paste | about 0.25 |

By another variant of this invention a method is provided for making a pizza-like food product for human consumption which method comprises the steps of: spreading the food paste as described hereinabove on a baked food product to provide a coated baked food product, and then heating the coated baked food product until the cheese melts.

Brief Description of Variants of the Invention

The final product formed is acidic, having a pH of 5.8.

The preferred cured or processed meat product is pepperoni (a sausage-like product) but other similar products, i.e. smoked saugage, ham or bacon may be substituted. The preferred cheese is mozarella, but other cheeses, e.g. parmesan, or cheddar may be used.

The essential ingredients of the food paste having characteristic pizza-like qualities of a broad aspect of this invention comprises a homogenized mixture of about 30 to about 50% by weight of the final product of water, about 2 to about 5% by weight of the final product of gelatinized wheat flour, about 2 to about 8% by weight of the final product of vegetable oil, about 0.5 to about 2% by weight of the final product of tomato paste, about 10 to about 35% by weight of the final product of cheese, and vinegar, and, dispersed therein, about 1 to about 35% by weight of the final product of sliced cured meat product in discrete sliced form. The other ingredients are optional, but enhance the flavour of the food spread. Moreover, the spices generally consist of paprika, anise, sage, celery seed, black pepper, garlic powder, onion powder, oregano, sweet basil, thyme and marjoram. The sodium citrate is included for the purpose of firming the cheese as well as providing an appropriate gloss to the cheese. The dehydrated green peppers which become discrete pieces upon absorption of water, dehydrated mushrooms which become discrete pieces upon absorption of water and onion powder which becomes onion paste upon absorption of water are included to provide a paste which, when applied to the surface of a baked and/or toasted product and then heated in a grill, provides a pizza-like product. Other ingredients traditionally used on pizzas, e.g. green olives, bacon, anchovies, or onions may also be provided.

BRIEF DESCRIPTION OF THE DRAWING

The accompanying drawing shows, in schematic form, the procedure according to one aspect of this invention to provide the food paste product of another aspect of this invention.

DETAILED DESCRIPTION OF THE DRAWING

As seen in the drawings, the essential ingredient 10, e.g. wheat flour and tomato powder and optional ingredients 11, e.g. spices, onion powder and sodium citrate are added along with a sufficient amount of hot water 12 to a heating vessel 13. These ingredients are heated for a sufficient period of time to permit gelatinization of wheat flour. Generally, the amount of water used is one-eighth of the total amount of added in the final food paste, i.e. 5–10% by weight of the final food paste. At a temperature of 175° F. to 185° 1 F. (80°–85° C.), this gelatinization reaction takes place in 4–5 minutes. After this initial step has been preformed, the remainder of the hot water 14 is added along with the vegetable oil, vinegar and cheese 15. While the cheese is preferably added at this time, the cheese may alternatively be added at a later stage along with the remainder of the ingredients.

This aqueous slurry or mixture, generally at a temperature of to 140°-160° F. (60°-71° C.), is passed through a mill 16 which reduces the particle size to provide a homogenized, fine, oil-in-water slurry emulsion. This emulsion is then pumped to a mixer 17 where the remainder of the ingredients having discrete form 18, e.g. sliced pepperoni (a sausage-like product), dehydrated green peppers, and dehydrated mushrooms are added. As pointed out before, if the cheese is not added along with ingredients 15, it may be added at this time.

It is to be observed that the pepperoni (a sausage-like product) must be in the form that it will withstand the rigours of pumping and filling. The pepperoni (a sausage-like product) therefore must be pliable and have a thickness and diameter to satisfy these conditions. In one example, the pepperoni (a sausage-like product) has a diameter of 2.5 cm and a thickness of 2.5 mm±0.5 mm. If the pepperoni (a sausage-like product) is too thin, it would break up in the mixer 17, while if it too thick, it will not be pliable enough.

The emulsion containing the discrete particles of food now is pumped to a thermostatically controlled heating vessel 19 for heating purposes. The food product is heated to temperature of 125°-135° F. (52°-57° C.) and is then pumped to a filling machine 20 where containers, e.g. cans are filled with the food product and are then hermetically sealed.

The hermetically sealed containers, e.g. cans are then placed in a retort 21 where the product is subjected to a sterilization process at a temperature of 240° F. (116° C.) for a time of, e.g. 75 minutes which renders the food product commercially sterile. The containers, e.g. cans are then cooled and stored at station 22.

Alternatively, as shown in broken lines in the drawing, the food product leaving the mixer 17 can be subjected to aseptic canning according to a now well-known procedure. Thus, the food may be heated in heating vessel 23 to a sterilization temperature of 180° F.-190° F. (82°-88° C.) for a time of e.g. 10-15 minutes. Then, without substantial cooling, the sterilized food product is placed in sterile containers, e.g. sterile cans at canning station 24 where the containers, e.g. cans are also hermetically sealed and the containers e.g. cans are then cooled and stored at station 22.

DESCRIPTION OF PREFERRED EMBODIMENT

In one specific example, the following procedure was followed:

Hot water, at just below the boiling point, is introduced simultaneously with wheat flour, tomato powder, spices, salt, sodium citrate, into a ribbon mixer. Mixing is carried on for 4-5 minutes to permit gelatinization of the flour. After this initial step in the process, a final portion of hot water along with ground mozarella cheese, vegetable oil and vinegar, are added to the mixer which is operating during the entire operation.

The mixture is then passed through a homogenizer in order to form a fine emulsion. The emulsion is then pumped to a second mixer where discrete particulate sliced cured meat, dehydrated mushrooms and dehydrated green peppers are added. From this second mixer, the mix is pumped to a heating vessel and heated to a temperature of 125°-135° F. The controlled-temperature mixture is then pumped to a filling machine where the containers are filled and hermetically sealed for subsequent sterilization.

The product is sterilized for a period of 75 minutes at a temperature of 240° F. (The time will vary with the size of container). After the sterilization, the product is cooled and packed in shipping containers.

USE OF PREFERRED EMBODIMENT

The food paste of aspects of this invention may be spread on toasted bread, rye bread or English muffins or prepared pizza pastry and then heated under a grill to provide a pizza-like product.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim

1. A process for providing a hermetically sealed, commercially sterile, food paste adapted to be spread on a baked product and then heated to provide a pizza-like product for human consumption comprising the steps of:
    (1) mixing about 2 to about 5% by weight of the final product of wheat flour, about 0.5 to about 2% by weight of the final product of tomato powder, and flavouring ingredients, with a sufficient quantity of water and for a sufficient period of time at a sufficient temperature to gelatinize the wheat flour;
    (2) adding further water along with about 2 to about 8% by weight of the final product of vegetable oil, vinegar and about 10 to about 35% by weight of the final product of cheese and heating the so-formed mixture to a temperature of about 140°-160° F. (about 60°-71° C.).
    (3) homogenizing said mixture to a fine, oil-in-water emulsion at a temperature of about 140°-160° F. (about 60°-71° C.);
    (4) adding about 1 to about 35% by weight of the final product of discrete sliced cured meat product having a thickness to provide sufficient pliability to withstand the rigours of pumping and filling; and
    (5) subjecting said food paste to heating, filling by pumping said homogenized mixture and said discrete sliced meat product, hermetic sealing, and sterilizing procedures, thereby to provide a commercially sterile food paste comprising a homogenized mixture of about 30 to about 50% by weight of final product of water, about 2 to about 5% by weight of the final product of gelatinized wheat flour, about 0.5 to about 2% by weight of the final product of tomato paste, about 2 to about 8% by weight of the final product of vegetable oil, about 10 to about 35% by weight of the final product of cheese, and vinegar, and, dispersed therein, about 1 to about 35% by weight of the final product of sliced cured meat product in discrete sliced form.

2. A process for providing a hermetically sealed, commercially sterile, food paste adapted to be spread on a baked product and then heated to provide a pizza-like product for human consumption comprising the steps of:
    (1) mixing about 2 to about 5% by weight of the final product of wheat flour, about 0.5 to about 2% by weight of the final product of tomato powder, and flavouring ingredients with a sufficient quantity of water and for a sufficient period of time a a sufficient temperature to gelatinize the wheat flour;

(2) adding further water along with about 2 to about 8% by weight of the final product of vegetable oil, and vinegar, and heating the so-formed mixture to a temperature of about 145°–165° F. (about 63°–74° C.);

(3) homogenizing said mixture to a fine oil-in water emulstion at a temperature of about 145°–165° F. (about 63°–74° C.);

(4) adding about 10 to about 35% by weight of the final product of cheese and about 1 to about 35% by weight of the final product of discrete sliced cured meat product having a thickness to provide sufficient pliability to withstand the rigours of pumping and filling; and (5) subjecting said food paste to filling by pumping said homogenized mixture and said discrete sliced meat product, hermetic sealing, and sterilizing procedures, thereby to provide a commercially sterile food paste comprising a homogenized mixture of about 30 to about 50% by weight of the final product of water, about 2 to about 5% by weight of the final product of gelatinized wheat flour, about 0.5 to about to about 2% by weight of the final product of tomato paste, about 2 to about 8% by weight of the final product of vegetable oil, about 10 to about 35% by weight of the final product of cheese, and vinegar, and, dispersed therein, about 1 to about 35% by weight of the final product of sliced cured meat product in discrete sliced form.

3. The process of claim 1 wherein said step (1) is carried out in the presence of about 5–10% of the total weight of the final product, of water for a time of about 4–5 minutes at a temperature of about 180°–190° F. (about 82°–88° C.).

4. The process of claim 2 wherein said step (1) is carried out in the presence of about 5–10% of the total weight of the final product, of water for a time of about 4–5 minutes at a temperature of about 180°–190° F. (about 82°–88° C.).

5. The process of claim 1 wherein said sliced cured meat product is present in the form of slices about 2.5±0.5 mm in thickness.

6. The process of claim 2 wherein said sliced cured meat product is present in the form of slices about 2.5±0.5 mm in thickness.

7. The process of claim 1 wherein said step (5) comprises the steps of:
(a) heating said food paste to a temperature of about 125°–135° F. (about 52°–57° C.);
(b) filing containers with said heated food paste by pumping said homogenized mixture and said discrete sliced meat product;
(c) hermetically sealing said containers; and
(d) retorting said hermetically sealed containers at a temperature of about 235°–245° F. (about 113°–118° C.) for about 60–90 minutes.

8. The process of claim 2 wherein said step (5) comprises the steps of:
(a) heating said food paste to a temperature of about 125°–135° F. (about 52°–57° C.);
(b) filling containers with said heated food paste by pumping said homogenized mixture and said discrete sliced meat product;
(c) hermetically sealing said containers; and (d) retorting said hermetically seal containers at a temperature of about 235°–245° F. (about 113°–118° C.)

9. The process of claim 1 wherein step (5) comprises the steps
(a) heating said food paste to sterilizing temperatures of about 180°–190° F. (about 82°–88° C.) for a time of about 10–15 minutes;
(b) then, without substantial cooling, filling sterile containers with said heated food paste by pumping said homogenized mixture and discrete sliced sliced meat product; and
(c) hermetically sealing said containers 10. The process of claim 2 wherein step (5) comprises the steps of:
(a) heating said food paste to sterilizing temperatures of about 180°–190° F. (about 82°–88° C.) for a time of about 10–15 minutes;
(b) then, without substantial cooling, filling sterile containers with said heated food paste by pumping said homogenized mixture and discrete sliced meat product; and
(c) hermetically sealing said containers.

11. The process of claim 1 including the final step of
(6) cooling said containers and storing said cooled containers.

12. The process of claim 2 including the final step of
(6) cooling said containers and storing said cooled containers.

13. The process of claim 7 wherein said step (5) includes the final step of:
(6) cooling said containers and storing said cooled containers.

14. The process of claim 8 wherein said step (5) includes the final step of:
(6) cooling said containers and storing said cooled containers.

15. The process of claim 9 wherein said step (5) includes the final step of:
(6) cooling said containers and storing said cooled containers.

16. The process of claim 10 wherein said step (5) includes the final step of:
(6) cooling said containers and storing said cooled containers.

17. A commercially sterile, canned food paste adapted to be spread on a baked product and then heated to provide a pizza-like product for human consumption comprising a homogenized mixture of about 30 to about 50% by weight of the final product of water, about 2 to about 5% by weight of the final product of gelatinized wheat flour, about 2 to about 8% by weight of the final product of vegetable oil, about 0.5 to about 2% by weight of the final product of tomato paste, about 10 to about 35% by weight of the final product of cheese, and vinegar, and, dispersed therein, about 1 to about 35% by weight of the final product of sliced cured meat product in discrete sliced form.

18. The sterile, canned, food paste of claim 17 further including therein about 0.5 to about 1.5% by weight of the final product of spices, about 0.3 to about 2% by weight of the final product of onion paste, about 0.5 to about 1.5% by weight of the final product of vinegar, about 1 to about 3% by weight of the final product of discrete pieces of green peppers, and about 0.3 to about 2% by weight of the final product of discrete pieces of mushrooms.

19. The sterile canned food paste of claim 17 wherein said sliced cured meat product is a sausage-like product having a thickness of about 2.5±0.5 mm.

20. The sterile canned food paste of claim 18 wherein said sliced cured meat product is a sausage-like product having a thickness of about 2.5±0.5 mm.

21. The commercially sterile food paste of claim 17 comprising the following:

| Ingredient | Proportion by weight |
| --- | --- |
| Water | about 30-50 |
| Sliced cured or processed meat product | about 1-35 |
| Cheese | about 10-35 |
| Vegetable oil | about 2-8 |
| Gelatinized wheat flour | about 2-5 |
| Sodium citrate | about 0.8-1.8 |
| Discrete pieces of green peppers | about 1-3 |
| Spices | about 0.5-1.5 |
| Tomato paste | about 0.5-2 |
| Vinegar | about 0.5-1.5 |
| Discrete pieces of mushrooms | about 0.3-2 |
| Onion paste | about 0.3-2 |

22. The commercially sterile food paste of claim 17 comprising the following:

| Ingredient | Proportion (% by weight) |
| --- | --- |
| Water | about 39.5 |
| Pepperoni (a sausage-like product) | about 26.00 |
| Mozarella cheese | about 20.00 |
| Vegetable oil | about 5.00 |
| Gelatinized wheat flour | about 4.00 |
| Sodium citrate | about 1.5 |
| Discrete pieces of green peppers | about 1.2 |
| Spices | about 1.1 |
| Tomato paste | about 0.8 |
| Vinegar | about 0.4 |
| Discrete pieces of mushrooms | about 0.35 |
| Onion paste | about 0.25 |

23. The process of claim 5 wherein said sliced cured meat product is a sausage-like product.

24. A method for making a pizza-like food product for human consumption which comprises: spreading the food paste of claim 17 on a baked food product to provide a coated baked food product and then heating said coated baked food product until the cheese melts.

25. A method for making a pizza-like food product for human consumption which comprises: spreading the food paste of claim 21 on a baked food product to provide a coated baked food product and then heating said coated baked food product until the cheese melts.

26. A method for making a pizza-like food product for human consumption which comprises: spreading the food paste of claim 22 on a baked food product to provide a coated baked food product and then heating said coated baked food product until the cheese melts.

* * * * *